United States Patent [19]

Okita et al.

[11] Patent Number: 5,045,351

[45] Date of Patent: Sep. 3, 1991

[54] PROCESS FOR PRODUCING A MAGNETIC RECORDING MEDIUM

[75] Inventors: Tsutomu Okita; Yasuo Nishikawa; Hiroshi Hashimoto; Hideomi Watanabe, all of Kanagawa, Japan

[73] Assignee: Fuji Photo Film Co., Ltd., Kanagawa, Japan

[21] Appl. No.: 423,290

[22] Filed: Oct. 18, 1989

[30] Foreign Application Priority Data

Oct. 18, 1988 [JP] Japan ................................. 63-260503
Oct. 18, 1988 [JP] Japan ................................. 63-260507

[51] Int. Cl.$^5$ .............................................. B05D 5/12
[52] U.S. Cl. ..................................... 427/130; 427/128
[58] Field of Search ................................ 427/128–132, 427/48; 428/694, 900; 252/62.54

Primary Examiner—Bernard Pianalto
Attorney, Agent, or Firm—Sughrue, Mion, Zinn, Macpeak & Seas

[57] ABSTRACT

A process for producing a magnetic recording medium which comprises a step of kneading a ferromagnetic powder with a binder in the presence of a solvent, a step of dispersing the resulting blend with the binder and/or solvent, and a step of coating the resulting magnetic coating composition on a nonmagnetic support followed by drying;

Wherein said step of kneading is carried out by kneading a ferromagnetic powder having a particle size of not more than 350 Å with a glycidyl compound and a binder comprising at least a vinyl chloride copolymer having an OH- terminated side chain bonded via an organic group and also having a polar group and/or a solvent; said binder, polyurethane resin, and solvent being used in a total amount of from 40 to 70 parts by weight per 100 parts by weight of said ferromagnetic powder; and wherein said step of dispersing is carried out in the presence of additional polyurethane resin having a polar group and/or solvent.

12 Claims, No Drawings

PROCESS FOR PRODUCING A MAGNETIC RECORDING MEDIUM

FIELD OF THE INVENTION

This invention relates to a magnetic recording medium comprising a non-magnetic support having provided thereon a magnetic layer containing, as main components, a ferromagnetic powder and a binder More particularly, it relates to a magnetic recording medium exhibiting excellent running properties, durability, and electromagnetic characteristics.

BACKGROUND OF THE INVENTION

Magnetic recording media are widely employed as audio tapes, video tapes, computer data tapes, floppy disks, and the like. Recording media of this type basically comprise a non-magnetic support having provided thereon a magnetic layer comprising a binder having dispersed therein a ferromagnetic powder.

Magnetic recording media are essentially required to have high levels of performance properties, such as electromagnetic characteristics, running durability, and running properties. In particular, through the recent spread of 8 mm video tape recorders, there is an increasing demand for video tapes to have high video outputs, excellent image reproducibility, and especially excellent electromagnetic characteristics.

Various improvements have been proposed with respect to electromagnetic characteristics of the magnetic recording media. Inter alia, introduction of an improvement in a ferromagnetic powder, i.e., a magnetic recording substance, is a direct and effective approach for achieving improved electromagnetic characteristics. Accordingly, there are tendencies that ferromagnetic powders are made finer and that iron oxide as a ferromagnetic powder has been replaced by iron oxide doped with different metals, e.g., cobalt. Quite recently, use of ferromagnetic metals, e.g., iron, nickel and cobalt, or alloys containing them has been extending.

Use of these improved ferromagnetic powders should reasonable make it possible to provide magnetic recording media having satisfactory electromagnetic characteristics. Actually, however, it is difficult to produce magnetic recording media manifesting improved electromagnetic characteristics in conformity with the improved characteristics of the ferromagnetic powder used. This is because dispersibility of ferromagnetic powders tends to be reduced as the powders become finer.

Moreover, there is a tendency that dispersibility of ferromagnetic powders decreases in the order of $\gamma$-$Fe_2O_3$, Co-doped $\gamma$-$Fe_2O_3$, and a ferromagnetic metal fine powder. That is, some improvement on ferromagnetic powders may result in deterioration of dispersibility of the powder, thereby failing to enable full use of the excellent characteristics of the improved ferromagnetic powder.

In order to obtain improved dispersibility of a ferromagnetic powder, it has been proposed to use binders containing a polar group, e.g., $-SO_3M$, $-OSO_3M_1$, $-PO_3M_2$, $-OPO_3M_2$, and $-COOM$ (wherein M is a hydrogen atom, an alkali metal, or an ammonium ion), or binders containing such a polar group and an epoxy ring as disclosed in JP-B-58-41565 (the term "JP-B" as used herein means an "examined published Japanese patent application"), JP-A-57-44227, JP-A-59-30235, JP-A-60-238306, JP-A-60-238309, and JP-A-60-238371 (the term "JP-A" as used herein means an "unexamined published Japanese patent application"). These binders exhibit high adsorptivity onto ferromagnetic powders and thereby improved capability of dispersing the powders as compared with conventional binders. Nevertheless, as the particle size of ferromagnetic powders is reduced for realizing high-density recording, dispersing becomes difficult even with a binder selected from these improved ones. It has, hence, been necessary to develop techniques to take full advantage of these binders having high dispersing ability.

It has been suggested to improve dispersed state of a ferromagnetic fine powder by conducting kneading and dispersing for preparing a magnetic coating composition for an extended period of time. However, since a considerable shearing force is exerted on the ferromagnetic fine powder during kneading and dispersing, characteristics of the powder are sometimes impaired. In addition, requirement of a long time for the production of a magnetic recording medium is undesirable for working efficiency.

It has also been proposed to conduct kneading by using a specific binder, e.g., a water-soluble carboxylic acid resin (see JP-B-57-42888) and polyvinyl butyral (see J-A-59-165237), and then add other binders or solvents to the mixture, followed by further dispersing, but sufficient dispersing effects have not yet been obtained.

Studies have hence been directed to techniques for effectively dispersing the above-described ferromagnetic powder without greatly alterating the process for producing general magnetic recording media. Methods so far proposed to this effect include a method of subjecting a ferromagnetic fine powder to surface treatment with a surface treating agent, e.g., a silane coupling agent, a method of using an additive for improving dispersibility of a ferromagnetic powder, e.g., fatty acids, and a method of using a binder system comprising a vinyl copolymer and a urethane prepolymer having incorporated thereinto a low-molecular epoxy resin (see JP-B-56-23210).

The treatment with a silane coupling agent makes the surface of the ferromagnetic powder hydrophobic to generally improve dispersion stability of the powder in a magnetic coating composition. In turn, however, the silane coupling agent-treated powder sometimes has reduced compatibility with resinous components and, in such cases, the final dispersed state of the ferromagnetic powder in a magnetic layer is not sufficient. Besides, the silane coupling agent itself is too expensive as a treating agent for ferromagnetic powders to be used in average magnetic recording media.

Fatty acids are usually used as a lubricant in a magnetic layer of magnetic recording media. Since fatty acids also have an effect of dispersing a ferromagnetic powder, it is possible to improve the dispersion of a ferromagnetic powder by controlling the amount of the fatty acid to be added. In general, however, sufficient dispersing effects of the fatty acids cannot be produced unless they are added in amounts larger than necessary for use as a lubricant for magnetic layers. It is known that a fatty acid when used in excess acts as a plasticizer of binders. Accordingly, use of the fatty acid as a dispersing agent for a ferromagnetic powder necessarily gives rise to the problem of plasticization of the binder.

On the other hand, improvement of dispersion of a ferromagnetic powder leads to smoothing of the surface of a magnetic recording medium, which results in deterioration of running properties. For example, addition of a large amount of a fatty acid brings about an improvement of dispersion but is insufficient in accomplishment of improvements in durability or running properties.

Further, when a low-molecular epoxy resin is incorporated into the specific binder system, with which a ferromagnetic powder is kneaded, there are disadvantages in that the kind of the binder is limited, the improvement on dispersibility of the ferromagnetic powder is not sufficient, and an extended kneading time impairs characteristics of the ferromagnetic powder.

JP-A-63-146218 also proposes use of a low-molecular epoxy compound as a binder, but it is used as one of the components of a binder system similar to JP-B-56-23210.

However, according to the techniques using low-molecular epoxy compounds, kneading or dispersing of the ferromagnetic powder is carried out by using a large amount of a binder or a solvent so that the mixture cannot be vigorously kneaded.

It has been proposed to use a vinyl chloride-based copolymer (e.g., a vinyl chloride-vinyl acetate-maleic anhydride copolymer) in combination with with a polyurethane resin as binder resins for a ferromagnetic metal fine powder. The combined use of these binder resins makes it possible to form a magnetic layer having improved characteristics required for a magnetic recording medium, such as strength.

According to the present inventors' examination, the vinyl chloride copolymer used as a binder resin sometimes releases chlorine bonded thereto in the form of hydrogen chloride when the magnetic recording medium is left to stand under severe conditions, for example, at a high temperature (e.g., above 80° C.) and a high humidity, for a long time. The released hydrogen chloride can corrode the ferromagnetic metal fine powder and ultimately other metallic parts of a reproducing device such as a video tape deck, e.g., a supporting rod, a Perrmalloy head, etc.

The inventors have developed a magnetic recording medium having a magnetic layer comprising a vinyl chloride-based copolymer and a polyurethane resin as binder resins, said vinyl chloride copolymer being stabilized by introducing a specific polar group and an epoxy group, as disclosed in JP-A-61-253627. Because the vinyl chloride copolymer resin therein used is stable, the proposed magnetic recording medium, even when placed in long-term contact with a reproducing device, such as a video tape deck, under, e.g., a high temperature and high humidity condition, causes virtually no corrosion of metallic parts of the device. Neither does it cause corrosion of a ferromagnetic metal fine powder, when used.

As a result of further investigations on the above-described magnetic recording medium, however, the inventors have found that even such a specific binder system tends to encounter difficulty in dispersing a ferromagnetic powder in special cases, for example in using a highly pulverized ferromagnetic powder. In other words, despite the use of a finely pulverized ferromagnetic powder, the resulting magnetic recording medium fails to manifest sufficiently improved electromagnetic characteristics in conformity with the improvement of the ferromagnetic powder itself.

In order to cope with the recent demand for high-density recording, there is a tendency that the surface of a magnetic layer should be smoothened as much as possible to thereby minimize spacing loss with a magnetic head. It is known that smoothing of the magnetic layer increases the coefficient of friction on contact with a magnetic head, a cylinder, a guide roller, etc. to thereby deteriorate running properties and durability. Use of various lubricants has therefore been proposed. Examples of proposed lubricants typically include fatty acids as disclosed in JP-B-44-18221 and JP-B-48-15007, fatty acid esters as disclosed in JP-B-43-23889 and JP-B-41-18065, and fatty acid amides as disclosed in JP-B-41-16984, JP-B-47-15624, JP-A-50-136009, JP-A-55-139637, and JP-A-54-46950 and, in addition, other fatty acids, silicone oils, fatty acid-modified silicones, and so on. Among them, fatty acids are excellent in lubricating properties as markedly reducing coefficient of friction and improving still mode durability and are thus frequently employed in combination with fatty acid esters or fatty acid-modified silicones. In this connection, resins having a polar group, e.g., a sulfonic acid radical and a phosphoric acid radical, and an epoxy group (see JP-A-61-123017 and JP-A-61-253627) have conventionally been used in combination with fatty acids or fatty acid esters.

Nevertheless, the above-stated combinations of binders and lubricants has not produced as great an effect on lubricating properties and dispersing properties as expected. It has hence been necessary to develop improved binders and lubricants suitable for use of the ultrafine ferromagnetic powders.

SUMMARY OF THE INVENTION

One object of this invention is to provide a magnetic recording medium exhibiting excellent, consistent electromagnetic characteristics with satisfactory durability and running properties.

Another object of this invention is to provide a process for producing the above-described magnetic recording medium by using a ferromagnetic powder having an extremely small particle size and highly dispersing the powder.

A further object of this invention is to provide a process for producing the above-described magnetic recording medium, in which the time required for dispersing is reduced while attaining a high degree of dispersion to thereby decrease the production cost.

A still further object of this invention is to provide a magnetic recording medium which achieves high-density recording while minimizing dropouts, a serious drawback for magnetic recording performance.

These and other objects of this invention will be made clear through the description hereinafter given.

A first embodiment of this invention resides in a process for producing a magnetic recording medium which comprises a step of kneading a ferromagnetic powder with a binder in the presence of a solvent, a step of dispersing the resulting blend with the binder and/or solvent, and a step of coating the resulting magnetic coating composition on a non-magnetic support followed by drying, wherein the step of kneading is carried out by kneading a ferromagnetic powder having a particle size of not more than 350 Å with a glycidyl compound and a binder comprising at least a vinyl chloride copolymer having an OH-terminated side chain bonded via an organic group and also having a polar group and/or a solvent, said binder, polyurethane resin, and solvent being used in a total amount of from 40 to 70 parts by weight per 100 parts by weight of the ferromagnetic powder, and wherein the step of dispersing is carried out in the presence of additional polyurethane resin having a polar group and/or a solvent; and a magnetic recording medium produced by the process.

A second embodiment of the present invention resides in a magnetic recording medium comprising a nonmagnetic support having provided thereon a magnetic layer comprising a ferromagnetic powder and a binder, wherein the magnetic layer contains at least a binder having at least one polar group selected from $-SO_3M$, $-OSO_3M$, $-PO_3M_2$, $-OPO_3M_2$, and $-COOM$, wherein M represents a hydrogen atom, an alkali metal, or an ammonium ion, and at least one epoxy group per molecule, and a fatty acid amide having from 12 to 26 carbon atoms.

DETAILED DESCRIPTION OF THE INVENTION

In the first embodiment, a fine ferromagnetic powder having a particle size of not more than 350 Å is strongly kneaded with a glycidyl compound, a binder having specific functional groups (i.e., an —OH group bonded via an organic group and a polar group), and a solvent, the total amount of the binder and the solvent being from 40 to 70 parts by weight per 100 parts by weight of the ferromagnetic powder, and then the resulting blend is diluted by dispersing together with the rest of the binder and/or solvent. According to this embodiment, there is provided a magnetic recording medium having an improved dispersed state and improved electromagnetic characteristics as well as improved durability and improved running properties. Vigorous kneading can be carried out by means of a pressure kneader or an open kneader, and the diluting and dispersing can be carried out by means of a sand mill, a ball mill, etc.

According to the second embodiment, the combination of the binder carrying an epoxy group and a specific polar group per molecule and a fatty acid amide brings about a surprising improvement in dispersibility of a ferromagnetic powder while retaining satisfactory running properties and durability. Moreover, there is produced an unexpected effect that the resulting magnetic recording medium is free from dropout. In general, a fatty acid is reactive with an epoxy ring possessed by a binder to form an insoluble matter which causes dropouts, or a fatty acid has great adsorptivity onto a ferromagnetic powder and inhibits adsorption of a binder on the powder, resulting in reduction of dispersibility of the powder. It is assumed, to the contrary, that the fatty acid amide used in this embodiment has small reactivity to an epoxy group or small adsorptivity to a ferromagnetic powder.

In greater detail, fatty acids are not only excellent as a lubricant but also markedly effective as a dispersing agent and accordingly have hitherto been employed in considerably amounts in a magnetic layer. As a result, the fatty acid seems to react with an epoxy group of a binder, thus losing its function as a lubricant and, at the same time, reducing the excellent dispersing ability of the epoxy group. When the binder according to the present invention which contains a specific polar group and an epoxy group in the same molecule is combined with a fatty acid amide, it is believed that the fatty acid amide produces no interaction as observed between the binder and the fatty acids so that the dispersing power of the epoxy group remains non-impaired while retaining the lubricating properties of the lubricant. In the present invention, all the fatty acids may be completely replaced with fatty acid amides, or fatty acids may be used in amounts reduced to such a degree that does not give rise to the above-described problem, taking the interaction with an epoxy group into consideration.

The first embodiment will hereinafter be described in detail.

The glycidyl compound which can be used in this embodiment typically includes commercially available epoxy resins, such as bisphenol A type epoxy resins, glycidyl-amine type epoxy resins, novolak epoxy resins, bisphenol F type epoxy resins, glycidyl ester resins, alicyclic epoxy resins, and aliphatic epoxy resins. Monomers, e.g., glycidyl methacrylate, and glycidyl phenol ether may also be used for assuring satisfactory dispersion of a ferromagnetic powder. These glycidyl compounds preferably have a molecular weight of not more than 1,000 and an epoxy equivalent of not more than 200 g/eq.

The bisphenol A type epoxy resins (epi-bis type epoxy resins) are represented by formula:

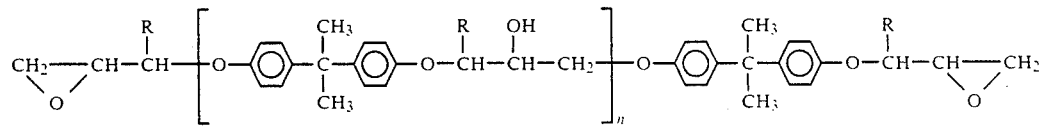

wherein n is a number of from 0 to 3; and R is a hydrogen atom or a methyl group.

The glycidylamine type epoxy resins are represented by formulae:

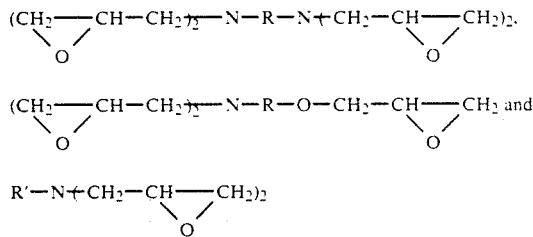

wherein R represents

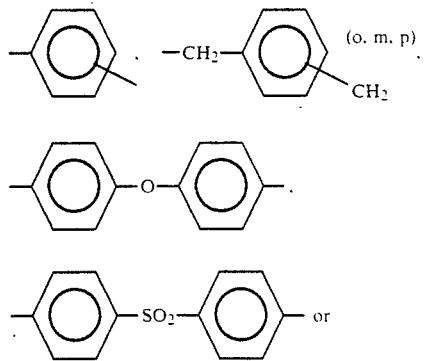

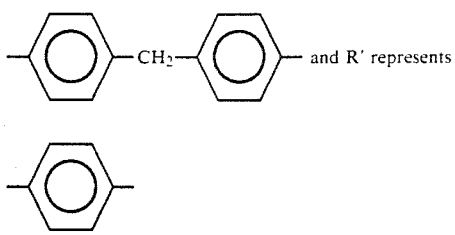

or a hydrocarbon group having from 4 to 24 carbon atoms.

The novolak epoxy resins are represented by formula:

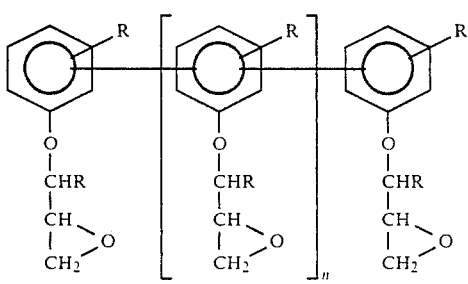

wherein R is a hydrogen atom or a methyl group; and n is a number of from 0 to 10.

The bisphenol F type epoxy resins are represented by formula:

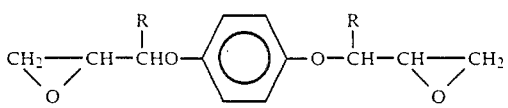

wherein R is a hydrogen atom or a methyl group.

The glycidyl ester resins are represented by formula:

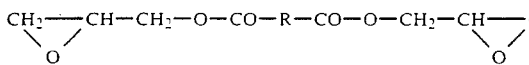

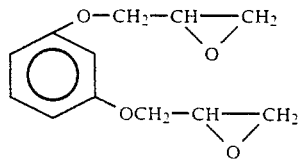

Resorsinol glycidyl ether is represented by formula:

The above-described glycidyl compounds have a molecular weight of 1,000 or less. If the molecular weight of the glycidyl compound exceeds 1,000, the effect to improve dispersibility of a ferromagnetic powder becomes small, and durability of the resulting magnetic recording medium rather tends to be reduced. The epoxy equivalent of the glycidyl compounds is preferably not more than 200 g/eq. If it exceeds 2,000, the effect of improving dispersibility becomes unfavorably small.

Specific examples of the glycidyl compounds are Epiol A, B, P, OH, M, EH, G-100, SB or TB produced by Nippon Oils & Fats Co., Ltd.; YH-434, YH-434L, YDPN-638, and YDCN-701S, 702S or 703S produced by Tohto Kasei K.K.; Epikote 801, 802, 807, 815, 825 or 828 produced by Shell Chem. Corp.; GY-250, 257 or 260 produced by Ciba Geigy Corp.; and TETRAD-X and TETRAD—C produced by Mitsubishi Gas Chem. Ind., Ltd.

The magnetic layer contains the glycidyl compounds usually in an amount of from 0.1 to 5 parts by weight per 100 parts by weight of a ferromagnetic powder. With the glycidyl compound content being between 0.15 and 4 parts, the dispersion of a ferromagnetic powder can further be ensured so that the magnetic layer has increased surface gloss. With the content being between 0.2 and 3.5 parts, the electromagnetic characteristics can be markedly improved. If the content is less than 0.1 part, the effect of the addition is hardly manifested. Addition of more than 5 parts brings about no further improvement on dispersibility of a ferromagnetic powder.

The vinyl chloride copolymer which can be used in the first embodiment is a copolymer having at least one of OH-terminated side chains represented by formulae (1) to (3) shown below and at lest one polar group.

$$—OCH_2CH_2CH_2)_n OH \quad (2)$$

$$—OCH_2CH_2CH_2CH_2)_n OH \quad (3)$$

wherein n represents an integer of from 1 to 15; and $R^1$ and $R^2$, which may be the same or different, each represents a hydrogen atom or an alkyl group.

The polar group is preferably selected from $—SO_3M$, $—OSO_3M$, $—PO_3M_2$, $—OPO_3M_2$, and $—CO_2M$, with $—SO_3M$ being more preferred. The polar group content in the copolymer preferably ranges from about $1 \times 10^{-7}$ to $1 \times 10^{-3}$ equivalent, more preferably from $1 \times 10^{-5}$ to $1 \times 10^{-\alpha}$ equivalent, per gram of the copolymer. If it is out of the recited range, dispersibility of a ferromagnetic powder is insufficient, and electromagnetic characteristics would be greatly reduced. The copolymer may contain more than one polar group.

The vinyl chloride copolymer has a weight average molecular weight of from 20,000 to 100,000, preferably from 30,000 to 80,000. If the molecular weight is out of the recited range, the dispersibility or durability would be deteriorated.

The vinyl chloride copolymer can be prepared by known methods as described, e.g., in JP-A-60-238306, JP-A-62-197921, JP-A-60-238309, JP-A-60-238371, JP-A-63-172710, JP-A-63-96727 and JP-B-1-29818.

The polyurethane resin which can be used in the first embodiment includes polyester polyurethane resins, polyether polyurethane resins, and polycarbonate polyurethane resins, each having introduced therein at least one polar group. The polyurethane resin preferably has a number molecular weight of from 10,000 to 100,000, more preferably from 20,000 to 60,000.

The polar group in the polyurethane resins is preferably selected from —COOM, —PO$_3$M$_2$, —OPO$_3$M$_2$, —SO$_2$M, and —SO$_3$M, wherein M represents a hydrogen atom, an alkali metal or an ammonium ion. The concentration of the polar group in the polyurethane resin preferably ranges from $1 \times 10^{-6}$ to $1 \times 10^{-3}$ eq/g, more preferably from $1 \times 10^{-5}$ to $1 \times 10^{-4}$ eq/g. If it is less than $1 \times 10^{-6}$ eq/g, dispersibility of a ferromagnetic powder, is reduced. If it exceeds $1 \times 10^{-3}$ eq/g, solubility of the polyurethane resin in organic solvents is reduced.

The aforesaid vinyl chloride copolymer and polyurethane resin both serve as a binder for binding ferromagnetic powders.

The binder to be used in the magnetic layer may further comprise, in addition to the vinyl chloride copolymer and polyurethane resin, other conventional binder resins, such as ethylene-vinyl acetate copolymers, cellulose derivatives (e.g., nitrocellulose), acrylic resins, polyvinyl acetal resins, polyvinyl butyral resins, epoxy resins, and phenoxy resins. These binder resins may be used either individually or in combination thereof.

In cases where these conventional binder resins are used in combination with the above-specific vinyl chloride copolymer and polyurethane resin, it is preferably that the binder should contain from 20 to 80% by weight, more preferably from 30 to 70% by weight, of the vinyl chloride copolymer and from 20 to 80% by weight, more preferably from 30 to 70% by weight, of the polyurethane resin, each based on the total binder.

If desired, the magnetic coating composition comprising the above-described components may further contain a polyisocyanate compound selected from those generally employed as curing agents for polyurethane resins, etc. Examples of such a polyisocyanate compound include a reaction product between 3 mols of tolylene diisocyanate and 1 mol of trimethylolpropane (e.g., Desmodur L-75 produced by Farbenfabriken Bayer A.G.), a reaction product between 3 mols of a diisocyanate (e.g., xylylene diisocyanate and hexamethylene diisocyanate) and 1 mol of trimethylolpropane, a biuret adduct of 3 mols of hexamethylene diisocyanate, an isocyanurate adduct of 5 mols of tolylene diisocyanate, an isocyanurate adduct of 3 mols of tolylene diisocyanate and 2 mols of hexamethylene diisocyanate, isophorone diisocyanate, and a diphenylmethane diisocyanate polymer.

These polyisocyanate compounds are preferably incorporated into the magnetic layer in an amount of from 10 to 50% by weight, more preferably from 20 to 40% by weight based on the binder.

The magnetic layer may furthermore contain a monomer or oligomer of an acrylic ester as a binder component which is cured by application of radiation.

In the production of a magnetic recording medium according to the first embodiment, the above-described ferromagnetic powder, glycidyl compound, and binder components are kneaded as follows. A given amount of the ferromagnetic powder is weighed and put in a kneader, e.g., a pressure kneader and an open kneader. The glycidyl compound, vinyl chloride copolymer and polyurethane resin, and if necessary, other binder components are added to the ferromagnetic powder, followed by kneading. The amount of the binder components should be adjusted so that the total amount of the binder and a solvent hereinafter described may fall within a range of from 40 to 70 parts by weight per 100 parts by weight of the ferromagnetic powder. Kneading can be effected by the use of the aforesaid pressure kneader or open kneader at a shear stress of from 30 to 500 kg/cm$^2$. If the total amount of the binder and solvent is less than 40 parts, the mixture cannot be kneaded due to a shortage of a solvent. If it exceeds 70 parts, too a large quantity of a solvent makes it impossible to strongly knead the mixture.

The solvent to be used for kneading preferably includes ketones, e.g., methyl ethyl ketone, methyl isobutyl ketone, and cyclohexanone; esters, e.g., ethyl acetate and methyl acetate; and aromatic hydrocarbons, e.g., toluene and xylene; with cyclohexane being particularly preferred.

The blend (magnetic coating composition) as obtained in the kneading step looks like a hard stone. In the dispersing step subsequent to the kneading step, the blend is diluted and dispersed by addition of the same binder or solvent so as to have an applicable concentration.

In what follows, the second embodiment of the present invention will be described.

The binder to be used in the second embodiment has at least one polar group selected from —OS$_3$M, —OSO$_3$M, —PO$_3$M$_2$, —OPO$_3$M$_2$, and —COOM, wherein M represents a hydrogen atom, an alkali metal, or an ammonium ion, preferably an alkali metal, and at least one epoxy group in the molecule thereof. Such a binder resin preferably includes copolymer resins, e.g., a vinyl chloride copolymer, a vinyl chloride-vinyl acetate copolymer, a vinyl chloride-vinyl propionate copolymer, and a vinylidene chloride-vinyl acetate copolymer.

The polar group in the binder preferably includes —OS$_3$M, and —COOM, more preferably —OS$_3$M. The content of the polar group in the binder preferably ranges from $1 \times 10^{-7}$ to $1 \times 10^{-3}$ equivalent, more preferably from $1 \times 10^{-5}$ to $5 \times 10^{-4}$ equivalent, per gram of the polymer. If it is out of the above-specified range, dispersibility of a ferromagnetic powder tends to be deteriorated, and electromagnetic characteristics tend to be greatly reduced. The binder may contain more than one kind of polar group. For further improving dispersibility, the binder further contains a hydroxyl group.

The content of an epoxy group in the binder resin ranges from $1 \times 10^{-4}$ to $1 \times 10^{-2}$ mol, preferably from $5 \times 10^{-4}$ to $5 \times 10^{-3}$ mol, per gram.

The binder has a weight average molecular weight between 20,000 and 100,000, preferably between 30,000 and 80,000. Binders having a molecular weight out of the recited range deteriorate dispersibility or durability.

The binder according to the second embodiment can be synthesized, for example, by addition reaction of a vinyl chloride-glycidyl (meth)acrylate copolymer or by modifying part of hydroxyl groups formed by saponification of a vinyl chloride-vinyl acetate copolymer. The methods described in JP-A-80-238306, JP-A-60-238309, and JP-A-60-238371 can also be adopted. Also usable are curing resins which are cured (polymerized) on application of radiation, e.g., electron rays, such as those disclosed in JP-A-61-89207, JP-A-61-106605, JP-A-57-40744, JP-A-59-8126, JP-A-62-112665 and JP-A-62112668.

The fatty acid amide which can be used in the second embodiment contains from 12 to 26 carbon atoms. Those containing from 14 to 18 carbon atoms are particularly effective for improving running properties and durability. Specific examples of preferred fatty acid amides include lauramide, myristamide, palmitamide, stearamide, isostearamide, oleamide, linolic acid amide, linolenic acid amide, arachic acid amide, elaidic amide, and behenamide; and N-alkyl or N,N-dialkyl derivatives of these fatty acid amides, e.g., N-methylmyristamide, N-ethylmyristamide, N-methylstearamide, N,N-dimethylstearamide, and N,N-diethylstearamide. Particularly effective among them are those in which the nitrogen atom is not substituted with an alkyl group(s) and the aliphatic chain is of straight and saturated structure.

A preferred process for producing the magnetic recording medium according to the second embodiment is as follows. Since a ferromagnetic powder undergoes secondary agglomeration because of its own magnetic properties, it is preferably to mechanically pulverize the powder beforehand to thereby shorten the time for kneading in the subsequent step. Pulverization can be carried out by means of a Simpson mixer, a sand mill, a sand grinder, a two-roll mill, a three-roll mill, an open kneader, a pressure kneader, a continuous kneader, a Henschel mixer, and the like. The apparatus used for the step of pulverization and that for the next kneading step are preferably the same so that a step of transfer may be unnecessary. It has been confirmed that omission of the step of pulverization increases requisite time of dispersing or results in unsatisfactory dispersion. In the kneading and dispersing step, a ferromagnetic powder, the binder, and a solvent are first kneaded in a roll mill, a kneader, etc. and then dispersed. Dispersing can be effected by the use of a sand mill, a ball mill, an attritor, a Henschel mixer, etc. On this occasion, the binder may be poured into the mixture either as dissolved in a solvent or separately from a solvent. The fatty acid amide may be added simultaneously with dispersing but preferably there after. Mixing with the fatty acid amide is usually carried out after preparation of the dispersion and immediately before coating by the use of a singles-crew disperser, a twin-screw disperser, a sand mill, a ball mill, a high-speed mixer, etc. In the case where a curing agent is used as a part of a binder, the curing agent can be added simultaneously with the fatty acid amide.

The fatty acid amide is suitably added in an amount of from 0.05 to 2%, particularly from 0.1 to 1.0%, by weight based on the ferromagnetic powder. If the amount of the fatty acid amide exceeds 2% by weight, the lubricant would be localized in excess on the surface of the magnetic layer, oozing out as a powder on the surface or causing problems such as sticking of a tape during running on a deck. Moreover, durability would be reduced due to the aforesaid action of plasticizing binders. Amounts less than 0.05% by weight do not produce any expected effect, only resulting in insufficient running properties.

If desired, the magnetic layer of the second embodiment may further contain lubricants other than the fatty acid amides, such as fatty acids having from 12 to 24 carbon atoms, fatty acid esters (various monoesters, as well as esters with polyhydric alcohols, e.g., sorbitan and glycerin, and esters of polybasic acids), metallic soaps, higher aliphatic alcohols, monoalkyl phosphates, dialkyl phosphates, trialkyl phosphates, paraffins, silicone oils, fatty acid-modified silicone compounds, fluorine-containing oils, perfluoroalkyl-containing esters, perfluoroalkyl-substituted silicone compounds, vegetable and animal oils, mineral oils, higher aliphatic amines; and in addition, inorganic fine powders, e.g., graphite, silica, molybdenum disulfide, and tungsten disulfide. Preferred of these lubricants are fatty acids containing from 14 to 22 carbon atoms, fatty acid esters having from 22 to 36 carbon atoms, esters having a perfluoroalkyl group containing 6 or more carbon atoms, and silicon compounds having a perfluoroalkyl group containing 6 or more carbon atoms.

The binder to be used in the second embodiment may further contain other conventional binder resins, such as vinyl chloride-vinyl acetate copolymers, vinyl chloride-vinyl alcohol-maleic acid and/or acrylic acid copolymers, vinylchlorid-evinylidene chloride copolymers, vinyl chloride-acrylonitrile copolymers, ethylene-vinyl acetate copolymers, cellulose derivatives (e.g., nitrocellulose), acrylic resins, polyvinyl acetal resins, polyvinyl butyral resins, epoxy resins, phenoxy resins, and polyurethane resins. Particularly preferred of these resins for ensuring high dispersibility and durability are polyurethane resins having introduced therein a polar group in the molecule thereof, e.g., an epoxy group, —COOH, —OH, —NH$_2$, —SO$_3$M, —OSO$_3$M, —PO$_3$M$_2$, and —OPO$_3$M$_2$, wherein M represents a hydrogen atom, an alkali metal or an ammonium ion. The details for these polyurethane resins are described in JP-A-57-165464, JP-B-58-41565, JP-A-62-40615, and JP-A-59-30235.

The content of the polar group in the above-described polyurethane resin preferably ranges from $1 \times 10^{-5}$ to $1 \times 10^{-3}$ eq/g. The polyurethane resin skeleton may be any of polyester, polyether, polyester ether and polycarbonate.

The above-enumerated high-molecular binder components may be used either individually or in combinations thereof. They may be subjected to curing treatment by adding a known isocyanate crosslinking agent, e.g., an adduct of 3 mols of tolylene diisocyanate and 1 mol of trimethylolpropane. The magnetic layer may also contain a curing binder system comprising acrylic ester oligomers and monomers which is cured by application of radiation.

In the first and second embodiments of the present invention, the binder components are used in a total amount usually of from 10 to 100 parts by weight, preferably from 20 to 40 parts by weight, per 100 parts by weight of a ferromagnetic powder.

The ferromagnetic powder which can be used in this invention includes ferromagnetic alloy powders, ferromagnetic iron oxide fine powders, Co-doped ferromagnetic iron oxide fine powders, ferromagnetic chromium dioxide fine powders, and barium ferrite. The powders of ferromagnetic alloys, Co-doped ferromagnetic iron oxide, ferromagnetic iron oxide or chromium dioxide usually have an acicular ratio of about 2/1 to 20/1, preferably 5/1 or more, and an average length of from about 0.2 to 2.0 μm. The ferromagnetic alloys to be used have a metal content of at least 75% by weight, with at least 80% by weight of the metal content being made of ferromagnetic metals, i.e., Fe, Co, Ni, Fe-Ni, Co-Ni and/or Fe—Co-Ni.

In the first embodiment, marked effects can be manifested in using ferromagnetic powders having a particle size of not more than 350 Å, particularly not more than 250 Å. In the second embodiment, marked effects are produced in using ferromagnetic powders having a particle size of not more than 500 Å, preferably not more than 400 Å, more preferably not more than 250 Å. The particle size as referred to herein is the one as determined by X-ray diffractometry. Further, manifestation of the effects of the present invention is particularly pronounced in using ferromagnetic powders having a pH of 8 or more. While the present invention is effectively applicable to ferromagnetic powders having very small particle sizes as specified above, improvements of electromagnetic characteristics, running properties, durability and the like can also be achieved even when ferromagnetic powders having greater particle sizes are used by following the concept of the present invention.

Organic solvent which can be used in kneading, dispersing and coating include ketones, e.g., acetone, methyl ethyl ketone, methyl isobutyl ketone, and cyclohexanone; esters, e.g., methyl acetate, ethyl acetate, butyl acetate, ethyl lactate, and glycol acetate monoethyl ether; ethers, e.g., ethyl ether, glycol dimethyl ether, and glycol monoethyl ether; aromatic hydrocarbons, e.g., benzene, toluene, and xylene; and chlorinated hydrocarbons, e.g., methylene chloride, ethylene chloride, carbon tetrachloride, chloroform, ethylene chlorohydrin, and dichlorobenzene.

If desired, the magnetic coating composition for forming a magnetic layer may further contain known additives, such as abrasives, dispersing agents, antistatic agents, and rust inhibitors. The abrasives to be used are not particularly limited as long as they have a Mohs hardness of 5 or more, preferably 8 or more. Examples of abrasives having a Mohs hardness of 5 or more are $Al_2O_3$ (Moh's hardness (hereinafter the same): 9), TiO (6), $TiO_2$ (6.5), $SiO_2$ (7), $SnO_2$ (6.5), $Cr_2O_3$ (9), and $\alpha$-$Fe_2O_3$ (5.5). These abrasives may be used either individually or in combinations thereof. Particularly preferred abrasives are those having a Mohs hardness of 8 or more. When an abrasive has a Mohs hardness of less than 5, it easily falls off from the magnetic layer, and since there is produced no substantial abrasive action on a magnetic head, the head is liable to undergo clogging. Further, an improvement in running durability of the magnetic recording medium is insufficient. The abrasive is usually used in an amount of from 0.1 to 20 parts by weight, preferably from 1 to 15 parts by weight, per 100 parts by weight of a ferromagnetic powder. The antistatic agent to be used preferably includes carbon black, particularly having an average particle size of from 10 to 300 nm.

Materials of a non-magnetic support on which the magnetic coating composition is coated includes polyesters, e.g., polyethylene terephthalate and polyethylene 2,6-naphthalate; cellulose derivatives, e.g., cellulose triacetate; and other plastics, e.g., polycarbonate, polyimide, and polyamide-imide. In addition, depending on the end use, non-magnetic metals, e.g., aluminium, copper, tin, and zinc, or non-magnetic alloys containing these metals, and plastics having deposited thereon a metal, e.g., aluminum, can also be employed. The support usually has a thickness of from 3 to 100 μm. For particular use as magnetic tapes, the support preferably has a thickness of from 3 to 20 μm. For particular use as magnetic disks, the support usually has a thickness of from 20 to 100 μm.

The non-magnetic support may be in the form of a film, a tape, a sheet, a disk, a card, a drum, etc. and the material can be selected from those described above according to the form.

For the purpose of preventing static charging, transferring, and wow flutter, improving strength of the magnetic recording medium, and matting the back side of the support, a backcoat can be provided on the support on the side opposite to the magnetic layer.

According to the first embodiment of the present invention, a ferromagnetic fine powder having a particle size of 350 Å or less can be kneaded with small amounts of a binder and a solvent, i.e., 40 to 70 parts by weight per 100 parts by weight of the ferromagnetic powder while exhibiting satisfactory dispersibility. There is thus provided a magnetic recording medium having excellent running properties and durability. It is true that the hydroxyl group in the binder is of relatively small polarity, thereby increasing a density of optional crosslinking with isocyanate and contributing to improvements in running properties and durability, but the above described effects cannot be satisfactorily explained only by the function of hydroxyl groups of the binder. The working mechanism of the first embodiment being unclear, it is considered that the glycidyl compound takes a complementary role in improving dispersibility and effecting strong kneading.

The present invention is now illustrated in greater detail with reference to the following examples, but it should be understood that the present invention is not deemed to be limited thereto. In these examples, all the parts and percents are by weight unless otherwise indicated.

EXAMPLE 1

| Magnetic Coating Composition: | |
|---|---|
| Ferromagnetic alloy powder (A) (Fe: 92%, Ni: 8%; Hc: 1,500 Oe; acicular ratio: 10/1; pH: 8.3; particle size: 250 Å) | 100 parts |
| Vinyl chloride copolymer (A) (Mn: 25,000; —OPO(OH)$_2$: 6 × $10^{-5}$ eq/g; —O(CH$_2$CH$_2$O)$_7$H: 6 × $10^{-4}$ eq/g) | 12 parts |
| Polyurethane resin (A) (Mn: 30,000; —SO$_3$Na: 8 × $10^{-5}$ eq/g) | 8 parts |
| Epoxy resin (A): Novolak epoxy resin (Epoxy eq.: 180 g/eq) | 1.5 parts |
| Methyl ethyl ketone | 30 parts |

The above components were pulverized and kneaded in an open kneader. Then, the components shown below were added to the blend, followed by kneading and dispersing in a sand mill for 120 minutes.

| Carbon black | 2 parts |
|---|---|
| α-Al$_2$O$_3$ | 2 parts |
| Methyl ethyl ketone | 200 parts |

To the resulting dispersion were added the following components:

| Stearic acid | 2 parts |
|---|---|
| Polyisocyanate (solid basis) ("Coronate L" produced by Nippon Polyurethane Ind. Co., Ltd.) | 6 parts |
| Butyl stearate | 2 parts |
| Methyl ethyl ketone | 50 parts |

After stirring for 20 minutes, the mixture was filtered through a filter having an average pore size of 1 μm to prepare a magnetic coating composition. The composition was coated on a 10 μm thick polyethylene terephthalate film to a dry thickness of 3.0 μm by means of a reverse-roll coater.

While the coating was undried, the magnetic layer thus formed on the non-magnetic support was subjected to orientation with a magnet having a magnetization force of 3,000 gauss. After drying, the medium was supercalendered and then slit into a 8 mm width to obtain a 8 mm video tape.

EXAMPLE 2

A 8 mm video tape was produced in the same manner as in Example 1, except for replacing the ferromagnetic fine powder (A) with a ferromagnetic fine powder (B) (Fe: 92%; Ni: 8%; Hc: 1,500 Oe; acicular ratio: 8/1; pH: 9.2; particle size: 200 Å.

EXAMPLE 3

A 8 mm video tape was produced in the same manner as in Example 1, except for replacing the polyurethane resin (A) with a polyurethane resin (B) (Mn: 30,000; —COOH: $8 \times 10^{-5}$ eq/g).

EXAMPLE 4

A 8 mm video tape was produced in the same manner as in Example 1, except for replacing the vinyl chloride copolymer (A) with a vinyl chloride copolymer (B) (Mn: 25,000; —COOH: $7 \times 10^{-5}$ eq/g); O—$(CH_2CH_2O)_8H$: $7 \times 10^{-4}$ eq/g).

EXAMPLE 5

A 8 mm video tape was produced in the same manner as in Example 1, except for replacing the vinyl chloride copolymer (A) with a vinyl chloride copolymer (C) (Mn: 40,000; —$SO_3Na$: $6 \times 10^{-5}$ eq/g); O—$(CH_2CH_2O)_7H$: $7 \times 10^{-4}$ eq/g).

EXAMPLE 6

A 8 mm video tape was produced in the same manner as in Example 1, except for replacing the polyurethane resin (A) with a polyurethane resin (C) (Mn: 25,000; —$OPO(OH)_2$: $8 \times 10^{-5}$ eq/g).

EXAMPLE 7

A 8 mm video tape was produced in the same manner as in Example 1, except for replacing the epoxy resin (A) with an epoxy resin (B) (amine type epoxy resin; epoxy equivalent: 110 g/eq).

COMPARATIVE EXAMPLE 1

A 8 mm video tape was produced in the same manner as in Example 1, except for replacing the vinyl chloride copolymer (A) with a vinyl chloride copolymer (C) (vinyl chloride-vinyl acetate copolymer; Mn: 30,000; no polar group).

COMPARATIVE EXAMPLE 2

A 8 mm video tape was produced in the same manner as in Example 1, except for replacing the vinyl chloride copolymer (A) with a vinyl chloride copolymer (E) (Mn: 30,000; —$OPO(OH)_2$: $6 \times 10^{-5}$ eq/g).

COMPARATIVE EXAMPLE 3

A 8 mm video tape was produced in the same manner as in Example 1, except for replacing the polyurethane resin (A) with a polyurethane resin (D) (Mn: 25,000; no polar group).

COMPARATIVE EXAMPLE 4

A 8 mm video tape was produced in the same manner as in Example 1, except that the epoxy resin(A) was not used.

COMPARATIVE EXAMPLE 5

A 8 mm video tape was produced in the same manner as in Example 1, except that the step of kneading in an open kneader was omitted.

EXAMPLE 8

A 8 mm video tape was produced in the same manner as in Example 1, except for increasing the amount of the methyl ethyl ketone used in the step of kneading to 45 parts.

COMPARATIVE EXAMPLE 6

A 8 mm video tape was produced in the same manner as in Example 1, except for increasing the amount of the methyl ethyl ketone used in the step of kneading to 80 parts.

Each of the video tapes obtained in Examples 1 to 8 and Comparative Examples 1 to 6 was evaluated for performance properties in accordance with the following test methods. The results obtained ar shown in Table 1.

1) Surface Gloss

A gloss of the surface of the magnetic layer at incident and reflective angles of 45° was measured by means of a standard glossmeter manufactured by Suga Shikenki K.K. and relatively expressed taking the gloss of the sample obtained in Comparative Example 1 as a standard (100%).

2) Electromagnetic Characteristics

A maximum flux density (Bm) and a squareness ratio (SQ) in a magnetic field (Hm) of 5 kOe were determined by means of a vibratory flux meter manufactured by Toei Kogyo K.K.

3) C/N

The video tape was run on a commercially available video tape recorder ("FUJIX-8" manufactured by Fuji Photo Film Co., Ltd.), and signals of 5 MHz were recorded and reproduced. The noise generated within a range of $5 \pm 1$ MHz on reproduction was measured, and a ratio of the reproduced signal to the noise (C/N) was obtained and relatively expressed taking the C/N of the sample obtained in Comparative Example 1 as a standard (0 dB). The measurements were conducted with an output level meter ("NV-870HD" manufactured by Matsushita Electric Ind. Co., Ltd.).

4) Running Properties

The video tape was brought into contact with a stainless steel pole at a contact angle of 180° C. and at a tape tension ($T_1$) of 50 g, and a tension ($T_2$) necessary to make the tape run a speed of 3.3 cm/sec was measured. A dynamic friction value $\mu$ according to equation:

$$\mu = 1/\pi \cdot \ln(T_2/T_1)$$

The test was performed at 25° C. and 70% RH (relative humidity) (Condition a) or at 40° C. and 80% RH (Condition b).

5) Durability

Predetermined video signals were recorded on the video tape using 'FUJIX-8". The time required for the reproduction output at a still mode to be reduced to 50% of the recorded signals was measured. At the time of measurements, the unloading function was relieved.

TABLE 1

| Example No. | Surface Gloss (%) | Bm (gauss) | SQ | C/N (dB) | Still Mode Durability (min) | μ a | b |
|---|---|---|---|---|---|---|---|
| Example 1 | 121 | 3,200 | 0.87 | +3.1 | ≧60 | 0.27 | 0.28 |
| Example 2 | 125 | 3,500 | 0.88 | +3.4 | ≧60 | 0.30 | 0.31 |
| Comparative Example 1 | 100 | 3,100 | 0.81 | 0.0 | 40 | 0.40 | 0.41 |
| Comparative Example 2 | 108 | 3,300 | 0.85 | +3.2 | 50 | 0.30 | 0.30 |
| Example 3 | 116 | 3,200 | 0.86 | +3.3 | ≧60 | 0.29 | 0.29 |
| Example 4 | 117 | 3,300 | 0.86 | +3.2 | ≧60 | 0.27 | 0.28 |
| Example 5 | 122 | 3,400 | 0.87 | +3.3 | ≧60 | 0.26 | 0.29 |
| Example 6 | 115 | 3,200 | 0.88 | +2.7 | ≧60 | 0.30 | 0.30 |
| Example 7 | 119 | 3,300 | 0.88 | +3.0 | ≧60 | 0.26 | 0.26 |
| Comparative Example 3 | 92 | 2,900 | 0.78 | −0.8 | 50 | 0.32 | 0.35 |
| Comparative Example 4 | 88 | 2,800 | 0.78 | −3.0 | 45 | 0.45 | 0.48 |
| Comparative Example 5 | 87 | 2,950 | 0.76 | −3.4 | ≧60 | 0.40 | 0.45 |
| Example 8 | 115 | 3,350 | 0.86 | 0.0 | ≧60 | 0.30 | 0.35 |
| Comparative Example 6 | 105 | 3,200 | 0.80 | −0.5 | ≧60 | 0.32 | 0.36 |

As is apparent from the results of Table 1, according to the first embodiment of the present invention, dispersion of ferromagnetic powders in the magnetic coating composition can be improved, which improvement leads to an improvement in dispersion of the powder in the magnetic layer formed, and there can thus be produced a magnetic recording medium exhibiting improved electromagnetic characteristics and excellent running properties.

During the kneading, the polar group of the vinyl chloride copolymer, the polar group of the polyurethane resin, and the epoxy group in the glycidyl compound (typically epoxy resin) make a contribution to accomplish thorough dispersion of the ferromagnetic powder. Further, the terminal hydroxyl groups of the side chains of the vinyl chloride copolymer can react with a polyisocyanate added for curing reaction to thereby increase a crosslinking density. As a result, the strength and running properties of the magnetic layer can be improved.

EXAMPLE 9

A hundred parts of a ferromagnetic alloy powder (Fe: 94%; Zn: 4%; Ni: 2%; Hc: 1,500 Oe; particle size: 200 Å) were pulverized in an open kneader and then kneaded with 10 parts of a compound prepared by adding sodium hydroxyethylsulfonate to a vinyl chloride-vinyl acetate-glycidyl methacrylate (86/9/5 by weight) copolymer (—SO$_3$Na: $6 \times 10^{-5}$ eq/g; epoxy group: $1 \times 10^{-3}$ eq/g; Mw: 30,000) (hereinafter referred to as Compound A) and 60 parts of methyl ethyl ketone. Then,

| | |
|---|---|
| —SO$_3$Na-containing urethane resin ("UR 8200" produced by Toyobo Co., Ltd.) | 8 parts (solid basis) |
| Abrasive (Al$_2$O$_3$; particle size: 0.3 μm) | 5 parts |
| Carbon black (particle size: 40 nm) | 2 parts |
| Methyl ethyl ketone/toluene (1:1 by volume) | 200 parts | were added to the blend, followed by dispersing in a sand mill for 120 minutes. To the resulting dispersion were further added:

| | |
|---|---|
| Polyisocyanate ("Coronate 304" produced by Nippon Polyurethane Co., Ltd.) | 8 parts (solid basis) |
| Stearamide | 1 parts |
| Butyl stearate | 2 parts |
| Methyl ethyl ketone | 50 parts | and the mixture was stirred for 20 minutes, followed by filtration through a filter having a pore size of 1 μm to prepare a magnetic coating composition. The composition was coated on a 10 μm thick polyethylene terephthalate support with a reverse-roll coater to a dry thickness of 3.0 μm.

While the coating was undried, the magnetic layer thus formed on the non-magnetic support was subjected to orientation in a magnetic field with a magnet of 3,000 gauss. After drying, the medium was subjected to supercalendering and slit to a width of 8 mm to obtain a 8 mm video tape.

In this and the following examples, the epoxy group content in binders was quantitatively determined by treating the binder in a 6N hydrochloric acid at 40° C. for 1 hour to open the epoxy ring, and the remaining HCl was determined by back titration with KOH.

COMPARATIVE EXAMPLE 7

A 8 mm video tape was produced in the same manner as in Example 9, except for replacing Compound A as used in Example 9 with a vinyl chloride-vinyl acetate-3-allyloxy-2-hydroxypopanesulfonate copolymer.

COMPARATIVE EXAMPLE 8

A video tape was produced in the same manner as in Example 9, except for replacing Compound A with a vinyl chloride-vinyl acetate-glycidyl methacrylate (86/9/5 by weight) copolymer as it was.

COMPARATIVE EXAMPLE 9

A video tape was produced in the same manner as in Example 9, except for replacing stearamide with stearic acid.

COMPARATIVE EXAMPLE 10

A video tape was produced in the same manner as in Comparative Example 7, except for replacing stearamide with stearic acid.

EXAMPLE 10

A video tape was produced in the same manner as in Example 9, except for replacing Compound A with a compound obtained in the same manner as for Compound A but having a —$SO_3Na$ content of $4\times10^{-4}$ eq/g and an epoxy group content of $4\times10^{-3}$ eq/g (Mw=30,000).

EXAMPLE 11

A video tape was produced in the same manner as in Example 9, except for replacing Compound A with a compound prepared in the same manner as for Compound A but having a —$SO_3Na$ content of $4\times10^5$ eq/g and an epoxy group content of $8\times10^{-4}$ eq/g (Mw=30,000).

EXAMPLE 12

A video tape was produced in the same manner as in Example 9, except for replacing stearamide with myristamide.

EXAMPLE 13

A video tape was produced in the same manner as in Example 9, except for using Co-doped $\gamma$-$Fe_2O_3$ (Hc: 900 Oe; particle size: 280 Å) as a ferromagnetic powder.

COMPARATIVE EXAMPLE 11

A video tape was produced in the same manner as in Example 13, except for replacing stearamide with stearic acid.

Each of the video tapes obtained in Examples 9 to 13 and Comparative Examples 7 to 11 was evaluated for running properties and durability in the same manner as in Examples 1 to 8. Further, an S/N and dropouts of the video tape were determined according to the following test methods. The results obtained are shown in Table 2.

6) S/N

Video signals of 7 MHz were recorded on the video tape by the use of a video tape recorder "FUJIX-8". The reproduction output was measured and relatively expressed taking that of the sample of Comparative Example 1 as 0 dB, provided that the tapes of Example 5 and Comparative Example 5 were slit to a width of ½ inch and tested by using an S-VHS video tape recorder "AG 6200" manufactured by Matsushita Elec. Ind. Co., Ltd.

7) Dropout

Dropouts in which the reproduction output level fell by 16 dB or more in a term of 1/10 H or more were counted with a dropout counter for a period of 1 minute. For recording and reproduction, "AG 6200" was used for the tapes of Example 5 and Comparative Example 5, and "FUJIX-8" was used for other tapes.

TABLE 2

| Example No. | S/N (dB) | $\mu$ | Still Mode Durability (min) | Dropouts |
| --- | --- | --- | --- | --- |
| Example 9 | +2.5 | 0.27 | ≧60 | 8 |
| Comparative Example 7 | 0.0 | 0.32 | 15 | 200 |
| Comparative Example 8 | −1.5 | 0.33 | 5 | 500 |
| Comparative Example 9 | +1.8 | 0.28 | 48 | 250 |
| Comparative Example 10 | −0.5 | 0.35 | 5 | 500 |
| Example 10 | +2.3 | 0.28 | ≧60 | 23 |
| Example 11 | +2.2 | 0.28 | ≧60 | 25 |
| Example 12 | +2.4 | 0.28 | ≧60 | 15 |
| Example 13 | +3.5 | 0.27 | ≧60 | 13 |
| Comparative Example 11 | 0.0 | 0.29 | 40 | 300 |

As is apparent from Table 2, it was proved that the second embodiment of the present invention, in which a magnetic layer contains a combination of a specific binder and a fatty acid amide, provides a magnetic recording medium exhibiting satisfactory electromagnetic characteristics, low dynamic friction coefficients, excellent still mode durability, and freedom from dropout.

As described above, the present invention provides a magnetic recording medium which contains an extremely fine ferromagnetic powder in a highly dispersed state and thereby exhibits satisfactory electromagnetic characteristics consistently with durability and running properties. According to the process of the present invention, the time required for dispersion can be shortened to reduce the production cost.

While the invention has been described in detail and with reference to specific embodiments thereof, it will be apparent to one skilled in the art that various changes and modifications can be made therein without departing from the spirit and scope thereof.

What is claimed is:

1. A process for producing a magnetic recording medium which comprises a step of kneading a ferromagnetic powder with a binder in the presence of a solvent, a step of dispersing the resulting blend with the binder and/or solvent, and a step of coating the resulting magnetic coating composition on a non-magnetic support followed by drying;

wherein said step of kneading is carried out by kneading a ferromagnetic powder having a particle size of not more than 350 Å with a glycidyl compound and a binder comprising at least a vinyl chloride copolymer having an OH-terminated side chain bonded via an organic group and also having a polar group and/or a solvent; said binder, and solvent being used in a total amount of from 40 to 70 parts by weight per 100 parts by weight of said ferromagnetic powder; and wherein polyurethane resin having a polar group is added in at least one of said step of kneading and said step of dispersing.

2. A process as claimed in claim 1, wherein said glycidyl compound has a molecular weight of not more than 1,000 and an epoxy equivalent of not more than 200 g/eq.

3. A process as claimed in claim 1, wherein said glycidyl compound is used in an amount of from 0.1 to 5 parts by weight per 100 parts by weight of said ferromagnetic powder.

4. A process as claimed in claim 1, wherein said OH-terminated side chain of the vinyl chloride copolymer is selected from groups represented by formula (1), (2) or (3):

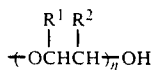

$\text{+OCH}_2\text{CH}_2\text{)}_n\text{OH}$ (2)

$\text{+OCH}_2\text{CH}_2\text{CH}_2\text{CH}_2\text{)}_n\text{OH}$ (3)

wherein n represents an integer of from 1 to 15; and $R^1$ and $R^2$, which may be the same or different, each represents a hydrogen atom or an alkyl group.

5. A process as claimed in claim 1, wherein said polar group of the vinyl chloride copolymer is selected from —SO$_3$M, —OSO$_3$M, —PO$_3$M$_2$, —OPO$_3$M$_2$, and —COOM, wherein M represents a hydrogen atom, an alkali metal atom, or an ammonium ion.

6. A process as claimed in claim 1, wherein the content of said polar group in the polyvinyl chloride copolymer is from about $1 \times 10^{-7}$ to $1 \times 10^{-3}$ equivalent per gram of the copolymer.

7. A process as claimed in claim 1, wherein said polyvinyl chloride copolymer has a weight average molecular weight of from 20,000 to 100,000.

8. A process as claimed in claim 1, wherein said polyvinyl chloride copolymer is used in an amount of from 20 to 80 wt % of said binder.

9. A process as claimed in claim 1, wherein said polar group of the polyurethane resin is selected from —COOM, —PO$_3$M$_2$, —OPOM$_2$, —SO$_3$M, and —SO$_2$M, wherein M represents a hydrogen atom, an alkali metal atom, or an ammonium ion.

10. A process as claimed in claim 1, wherein the content of said polar group in the polyurethane resin is from $1 \times 10^{-6}$ to $1 \times 10^{-3}$ equivalent per gram of the resin.

11. A process as claimed in claim 1, wherein said polyurethane resin is used in an amount of from 20 to 80 wt % of said binder.

12. A process as claimed in claim 1, wherein said magnetic coating composition further comprising a polyisocyanate compound.

* * * * *